US007426397B2

(12) United States Patent
Copeland

(10) Patent No.: US 7,426,397 B2
(45) Date of Patent: Sep. 16, 2008

(54) INTERACTIVE DIGITAL TELEVISION MESSAGING SYSTEM

(75) Inventor: Rebecca Copeland, Kenilworth (GB)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 10/527,296

(22) PCT Filed: Sep. 10, 2003

(86) PCT No.: PCT/GB03/03902

§ 371 (c)(1),
(2), (4) Date: Mar. 9, 2005

(87) PCT Pub. No.: WO2004/025940

PCT Pub. Date: Mar. 25, 2004

(65) Prior Publication Data
US 2006/0046695 A1  Mar. 2, 2006

(30) Foreign Application Priority Data
Sep. 11, 2002 (GB) ................. 0221000.3

(51) Int. Cl.
H04Q 7/20 (2006.01)
(52) U.S. Cl. .................. 455/461; 379/211.02
(58) Field of Classification Search ......... 455/466, 455/414.1, 414.2, 414.3, 414.4, 461; 379/211.02
See application file for complete search history.

(56) References Cited
U.S. PATENT DOCUMENTS
5,870,454 A    2/1999  Dahlen
6,668,049 B1 * 12/2003  Koch et al. ............ 379/211.02

FOREIGN PATENT DOCUMENTS
WO  WO 00/44173   7/2000
WO  WO 00/51318   8/2000
WO  WO 02/32134 A1  4/2002

OTHER PUBLICATIONS
Aiken, Peter, et al., Microsoft Computer Dictionary, 2002, Microsoft Press: 5th Edition, p. 335.*

* cited by examiner

Primary Examiner—William D Cumming
(74) Attorney, Agent, or Firm—Kirschstein, et al.

(57) ABSTRACT

A message delivery system is arranged to accept a message from a message source and deliver it to a message recipient in a telecommunications system including an Intelligent Network platform having a plurality of applications, each application being stored at a respective Service Control Point within the Intelligent Network platform, the plurality of applications being able to handle received messages and deliver them to the recipient. The message source and the message recipient can be a digital television system.

16 Claims, 1 Drawing Sheet

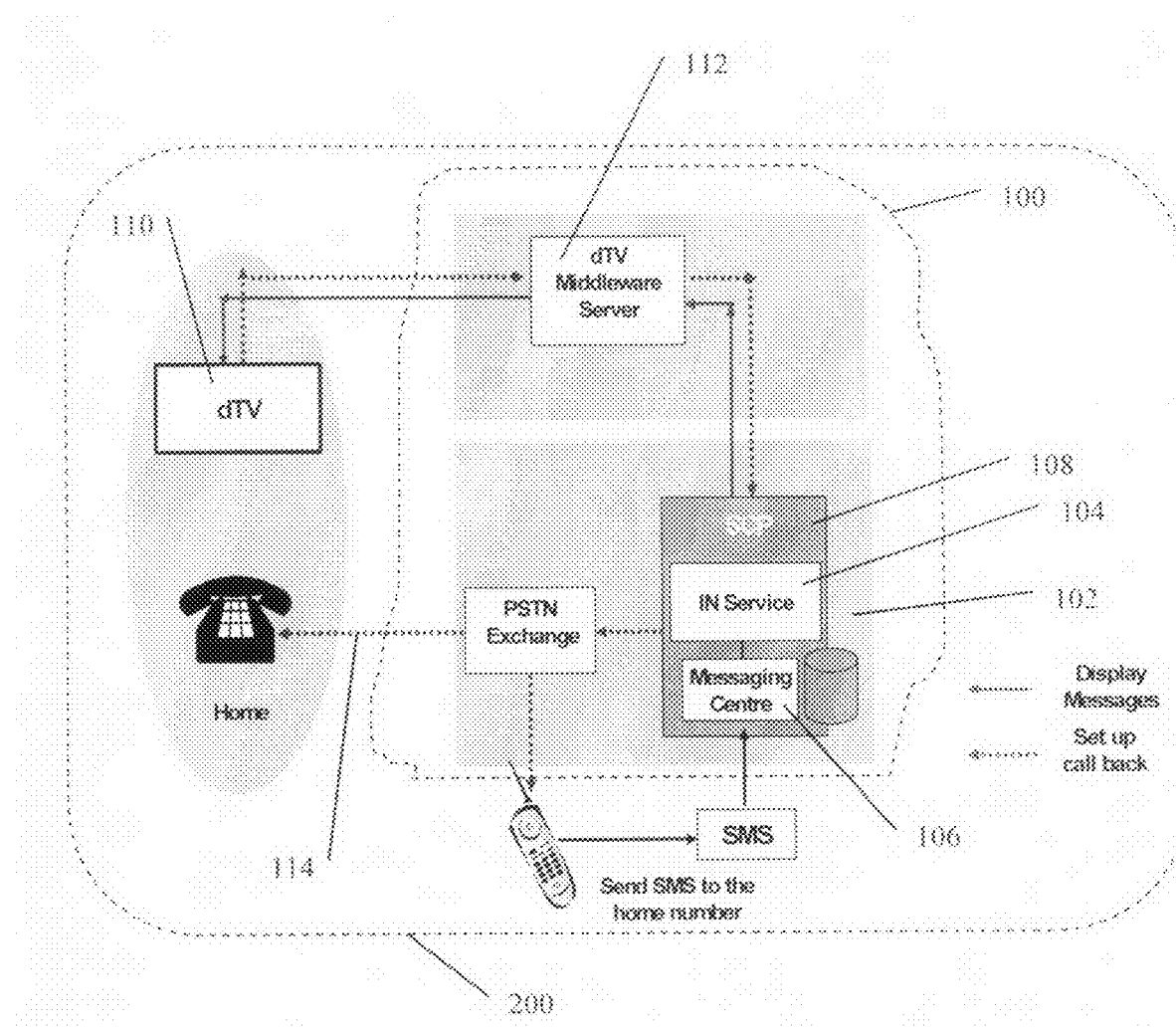

INTERACTIVE DIGITAL TELEVISION MESSAGING SYSTEM

FIELD OF THE INVENTION

The present invention is concerned with delivering messages, for example to a TV screen, which is associated with a fixed telephone line, and delivered using an Intelligent Network (IN).

BACKGROUND OF THE INVENTION

The interactive television set may be an analogue television set with a Controller (a decoder, or a 'set-top box', for example) or an integrated digital Television set, both of which will be referred to as 'a dTV' herein. The messaging service may be, for example, GSM Short Message Service (SMS) or IP-based Instant Messaging where a telephone number is associated with the sender. The messages can also contain images and video clips, sent via Multimedia Messaging services, using WAP or 3G and similar technologies.

BRIEF SUMMARY OF THE INVENTION

According to the present invention there is provided a message delivery means arranged to accept a message from a message source and deliver it to a message recipient device, comprising a telecommunications system including an Intelligent Network platform including a plurality of applications, each application being stored at a respective Service Control Point within the Intelligent Network platform, the plurality of applications including means to handle received messages and deliver them to the recipient device.

There is further provided a telecommunications system comprising a message source, a message recipient device and an Intelligent Network platform including a plurality of applications, each application being stored at a respective Service Control Point within the Intelligent Network platform, the plurality of applications including a message delivery means arranged to accept a message from the message source and deliver it to the recipient device.

BRIEF DESCRIPTION OF THE DRAWING

The present invention will now be described with reference to the accompanying single FIGURE, which shows an example of a dTV messaging configuration.

DETAILED DESCRIPTION OF THE INVENTION

The present invention provides a telecommunications system 200 comprising a message source and a message recipient device, one example of which is a dTV 110, plus Intelligent Network services 104, message centres, and means of delivering 100 web pages to a dTV. The message source and the recipient device can be mobile telephones, fixed telephones, computers, personal assistants (PDA), dTVs and various other media and devices.

The invention is likely to increase the volume of messages and bring new revenue to Operators. It would be targeted predominantly at the residential market, or wherever a dTV can be associated with a fixed telephone line. Messages on a TV screen are more readable, generally able to display more information at any one time, and may suit a different population segment. Messages can be sent to a family as an entity or to those who do not have mobile telephones at all. Even mobile telephone users may prefer this service while at home, since they often tend to switch their mobile telephones off and keep the television on. The TV is a focal point at home that can act as a convenient medium for message retrieval.

The message callback function included in the present invention is also set to increase revenues for the fixed line Operator. It facilitates calling back the message-sender by means of click-to-talk while viewing messages on the dTV. This is a convenient way of making voice contact with the message sender, without having to look up the number or dial out. It brings more traffic to the fixed network whilst saving money for users, since it sets up calls for fixed line telephones instead of users calling back from mobile telephones.

From the user point of view, the dTV is the medium for receiving and sending text messages, as well as responding to a message by calling back and establishing a voice/multimedia session.

The user may be notified of waiting messages by either an indicator on the dTV 110 (or the set-top-box), or an icon on the TV screen. The service can be accessed by pressing a designated button on a dTV remote control. The user is then able to view text messages, along with sender details, messages time and date and other related information.

The users can use the dTV remote control or similar devices for navigation and for message management, for example—for deleting messages. The user can also enter new messages via the dTV, by a number of means, for example typing replies via:

the remote control (with mapping to a keyboard);
a soft keyboard displayed on the dTV screen, or
infra-red portable keyboard.

The entered messages, addressed to either the sender of the currently selected message, or to a new addressee (by a telephone number), can then be dispatched.

If the user wishes to respond to the currently viewed message by a telephone call, the callback function can be selected. The user's own telephone rings first, which ensures that a callback was intended and not accidental. When the user hears the telephone ring and picks up the receiver, the destination is then automatically dialed. If the original message-sender answers, the call is connected.

Delivery Service 100 elements such as the following may be used:

Messaging centre 106 (text or multimedia) that can handle fixed telephone addressees;
Interworking with dTV 'middleware' 112 and the dTV;
An IN service 104 that formats the message data and sends it on in dTV browser format;
An IN service 104 that sets up a call from the associated fixed line 114 to the message sender, and/or
An IN service 104 that generates charging information for messages in the same way as for telephone calls.

The IN services 104 and the Messaging centre 106 are part of a Service Control Point 108, which is part of an Intelligent Network platform 102.

The recipient message centre 110 must recognise that a destination number is not a mobile telephone, accept a fixed line telephone number as a valid destination, and trigger the IN service 104. There the dTV address associated with the fixed line number 114 is retrieved. The service sends a message-waiting notification to the dTV 110, to light up an indicator or display an icon on the TV screen.

When a user clicks on the service icon, the dTV browser sends a request to the IN service 104 to forward the stored message(s) to the dTV 110. The IN service 104 authenticates the user, identifies the user's personal message store, retrieves the text (or the multimedia file) and reformats it for the special dTV browser.

Users can enter outgoing messages, whether in response to received messages or not, and the message data together with the addressee's telephone number are sent to the IN service 104, via the dTV browser. The IN service 104 formats the message and forwards it to the message centre for delivery in the appropriate messaging service network.

The callback function is activated on the dTV 110 as a 'click-to-dial', where the user's associated fixed line telephone is connected. The IN service 104 is actually performing a 'third party calling', initiated by a program, not by dialing. The IN service 104 obtains the message sender's Calling Line Identity (CLI) and uses it as the destination. The sender's number may be a mobile number or a fixed line associated with the sender, or any device using telephone numbers. When the call is connected, the IN service 104 will then produce call-charging information that will be billed to the user's fixed line 114.

Outgoing messages cause the IN service 104 to pass charging information to the switch, for it to generate billing records, which can be processed for the normal fixed line subscriber's bill. Furthermore, special incoming messages can also generate charging information, to allow adding items to the telephone bill and to notify the user.

The FIGURE demonstrates, by way of example, how this new service operates. Note that the invention works with either an integrated message centre or an external one, and with a variety of messaging sources and destinations.

The invention claimed is:

1. A message delivery means for accepting a user-entered message from a message source, the message comprising user-entered text message data and an address of the addressee, and for delivering the user-entered message to a message recipient device, comprising: a telecommunications system including an intelligent network (IN) platform including a plurality of applications, each application being stored at a respective service control point within the IN platform, the plurality of applications including means for handling each received user-entered message and for delivering the received user-entered message to the recipient device, the IN platform being operative for sending a message-waiting notification to said message recipient device, and for sending the message to said message recipient device after receiving a request from the user and authenticating said user, and for reformatting the message for a specific browser of said message of recipient device.

2. The message delivery means as claimed in claim 1, wherein the message source comprises at least one selected from a group comprising a mobile telephone, a WAP telephone, an IP/SIP telephone, a computer, a personal assistant device, and a dTV.

3. The message delivery means as claimed in claim 1, wherein at least one of the recipient device and the message source is a dTV.

4. The message delivery means as claimed in claim 3, wherein the dTV is connected via a controller that enables the dTV to be connected to the IN platform by at least one of a dial-up, DSL, satellite and cable modem.

5. The message delivery means as claimed in claim 3, wherein the dTV initiates calling back a message sender using a received calling line identity.

6. The message delivery means as claimed in claim 5, wherein a call is set up for a user's fixed line telephone and is billed on a bill for the user's fixed line telephone.

7. The message delivery means as claimed in claim 1, wherein the IN platform includes a billing application for generating billing information for the user-entered message in the same way as billing information is generated for telephone calls.

8. A telecommunications system, comprising: a message source; a message recipient device; and an intelligent network (IN) platform including a plurality of applications, each application being stored at a respective service control point within the IN platform, the plurality of applications including a message delivery means for accepting a user-entered message comprising user-entered text message data and an address of the addressee from the message source and for delivering the user-entered message to the recipient device, the IN platform being operative for sending a message-waiting notification to said message recipient device and for sending the message to said message recipient device after receiving a request from the user and authenticating said user, and for reformatting the message for a specific browser of said message of recipient device.

9. The telecommunications system as claimed in claim 8, wherein the message source comprises at least one selected from a group comprising a mobile telephone, a WAP telephone, an IP/SIP telephone, a computer, a personal assistant device, and a dTV.

10. The telecommunications system as claimed in claim 9, wherein at least one of the recipient device and the source device is a dTV.

11. The telecommunications system as claimed in claim 10, wherein the dTV is connected via a controller that enables the dTV to be connected to the IN platform by at least one of a dial-up, DSL, satellite, and cable modem.

12. The telecommunications system as claimed in claim 10, including means for using the dTV to initiate calling back a message sender using a received calling line identity.

13. The telecommunications system as claimed in claim 12, wherein a call is set up for a user's fixed line telephone and is billed on a bill for the user's fixed line telephone.

14. The telecommunications system as claimed in claim 8, wherein the IN platform includes a billing application for generating billing information for the user-entered message in the same way as billing information is generated for telephone calls.

15. The message delivery means as claimed in claim 1, in which the address is the addressee's telephone number.

16. The telecommunication system as claimed in claim 8, in which the address is the addressee's telephone number.

* * * * *